(12) United States Patent
Koktan et al.

(10) Patent No.: US 7,451,387 B2
(45) Date of Patent: Nov. 11, 2008

(54) AUTONOMOUS METHOD AND APPARATUS FOR MITIGATING SOFT-ERRORS IN INTEGRATED CIRCUIT MEMORY STORAGE DEVICES AT RUN-TIME

(75) Inventors: Toby James Koktan, Nepean (CA); Robert Morton, Nepean (CA); David Henry Graham, Kanata (CA); James Wisener, Ottawa (CA); David Motz, Ottawa (CA); Saida Benlarbi, Ottawa (CA); David Ambrose Stortz, Kanata (CA)

(73) Assignee: Alcatel Lucent, Paris (FR)

( * ) Notice: Subject to any disclaimer, the term of this patent is extended or adjusted under 35 U.S.C. 154(b) by 539 days.

(21) Appl. No.: 11/177,381

(22) Filed: Jul. 11, 2005

(65) Prior Publication Data

US 2007/0011575 A1 Jan. 11, 2007

(51) Int. Cl.
G06F 11/00 (2006.01)
G11C 29/00 (2006.01)
(52) U.S. Cl. .................................. 714/805; 714/54
(58) Field of Classification Search ................ 714/800, 714/805, 49, 52, 54; 375/224
See application file for complete search history.

(56) References Cited

U.S. PATENT DOCUMENTS 4,360,917 A * 11/1982 Sindelar et al. ............. 714/805
5,898,711 A * 4/1999 Buer ........................... 714/800
6,310,911 B1 * 10/2001 Burke et al. ................. 375/224

OTHER PUBLICATIONS

Increasing Network Availability: Detecting and Correcting Network-Impacting Single Event Upset (SEU) Parity Events, White Paper.

* cited by examiner

Primary Examiner—Shelly A Chase (57) ABSTRACT

Apparatus and methods for autonomously identifying and mitigating soft-errors affecting integrated circuit memory storage devices are provided. A soft-error mitigation process is invoked upon finding that an integrated circuit memory device is affected by a parity error. In a staged approach, unused memory regions of the integrated circuit memory device are reinitialized; if a redundant deployment prevails, the subsystem corresponding to the affected integrated circuit memory device is reset; memory regions having copies of contents thereof stored at remote locations are rewritten with obtained copies of the contents; and memory regions storing contents which are generated at run-time are reinitialized. Directed parity error scans are employed at each stage. If the parity error persists, one of the apparatus, and the subsystem corresponding to the affected silicon memory device is reset during a maintenance window. Advantages are derived from a run-time soft-error mitigation process which increases availability, and reduces maintenance overheads and the need for hardware replacement.

15 Claims, 3 Drawing Sheets

AUTONOMOUS METHOD AND APPARATUS FOR MITIGATING SOFT-ERRORS IN INTEGRATED CIRCUIT MEMORY STORAGE DEVICES AT RUN-TIME

FIELD OF THE INVENTION

The invention relates to error detection and correction in memory devices, and in particular relates to the run-time mitigation of soft-errors experienced by integrated circuit memory storage devices in improving the reliability of systems employing thereof for storing data and/or executable code for long periods of time.

BACKGROUND OF THE INVENTION

In the field of integrated circuit memory storage, a memory storage cell includes an arrangement of semiconductor components on a wafer; the combined operation of which defines one of a logic high and a logic low memory storage cell state.

It is very desirable for memory storage cells to have a fast state change in order to provide fast memory writes and therefore fast memory access. The state of each memory storage cell is defined by electromagnetic characteristics. Electric currents, electric potentials, electric fields, magnetic fields, etc. stronger than naturally occurring ones, are employed to intentionally change and maintain memory storage cell states. A balance must be struck, as stronger electric currents, currents, potentials, electric fields and magnetic fields reduce the speed of the integrated circuit memory and the expended power. Market pressures have pushed the development of integrated circuit memory storage towards high density miniaturized micropower integrated circuit memory storage devices operating just above reasonably shieldable average naturally occurring electric currents, potentials, electric fields and magnetic fields. The envelope of the possible and usable is constantly pushed through miniaturization.

A soft-error, also known as single event upset, is a memory bit error in an integrated circuit memory storage device caused by unintended uncontrollable phenomena; typically natural phenomena such as the chance incidence of, radiation, high-energy neutrons or cosmic rays; non-intentionally subjecting memory cells of the silicon memory storage device to a significantly stronger electric current, potential, field or magnetic field, so as to induce a state change of at least one memory cell, typically corrupting bit values stored.

While such common external events have a low probability to affect any particular integrated circuit memory storage device, in a system with large amounts of integrated circuit memory storage and/or systems which are required to have long duration up-times; such soft-errors have been found to occur several times per year, often causing service affecting problems. For example, telecommunications equipment is required to have both large memory stores and up-times measured in years. In a typical communications network employing a large number of cooperating interconnected interdependent telecommunications network nodes, the deleterious effect of a single soft-error experienced by a single network node will often affect the operation of multiple network nodes directly or indirectly connected thereto.

Without implying any limitations, by far the most common causes of soft-errors relate to naturally occurring radioactive discharge events and cosmic ray emissions. Alpha-particles, for example, have a limited penetration through matter and therefore soft-errors due to alpha-particle discharge events can be greatly limited by ensuring that the materials used in and about the integrated circuit memory storage device are radioactively inert. Cosmic rays however generate subatomic particle showers, specifically energetic neutron showers, which can penetrate matter to great depths. While shielding for all intents and purposes is only effective against alpha-particles; regardless of source, soft-errors are more likely to occur under improper cooling conditions as the electrons in the substrate of the integrated circuit memory storage device are more susceptible to being knocked off to higher orbital levels. The cost of shielding against alpha-particle discharges has to be balanced against the inseparable cost of cooling, as shielding also tends to prevent proper cooling. Nevertheless, soft-errors represent a continuing problem that needs to be addressed.

Techniques typically used in an attempt to mitigate memory errors include Error Correction Coding (ECC). Error correcting coding adds extra information to data bits in a fashion that allows corrections to be made to the data bits if one or two of combination of bits is changed. Typical error correcting codes provide for the correction of a single bit error and the detection dual bit errors, and require additional 8 bits to a group of memory cells used for storing a 64 bit long data word. Currently known ECC techniques cannot be used to address more than two bit errors.

ECC techniques are usually not implemented on large Synchronous Static Random Access Memories (SSRAM) employed in typical high-speed low-power applications, because of the already large size and increased cost of the SSRAM memory chips compared to less expensive and smaller Dynamic Random Access Memory (DRAM) chips. SSRAM is implemented using five to six gates per memory cell compared to a single gate for each DRAM memory cell, the additional ECC memory bits also employing the same number of gates. Therefore in SSRAM applications, soft-errors which could have been mitigated had ECC technology been employed, remain uncorrected.

Other current research and development relates to more sophisticated memory error detection techniques however implementing such techniques is subject to substantial development costs, substantial testing and validation overheads, and substantial operational overheads.

Other techniques typically used to detect bit errors include parity checking. Parity memory is used to detect memory bit errors. Each byte of data (typically 8 bits implemented as a group of 8 memory cells) is accompanied by a parity bit the value of which is determined by the number of ones (the number of memory cells in the logic high state) stored therein. Even/odd parity ensures that the total number of energized memory cells storing the data bits and parity bit is even/odd. Parity memory is most commonly used on microcomputers employing small word sizes. Typically, parity error check monitoring has, up to now, only been performed in hardware for entire memory storage devices, with no capability to pinpoint the exact location in the memory device of the affected memory cell. Parity checking techniques can be used to detect more than two memory bit errors.

Soft-errors manifest themselves as parity errors inevitably incurring large maintenance overheads. Until recently memory chips operated at high voltages and parity errors were associated with faulty hardware. Traditional approaches to addressing memory errors include:

hardware resetting or power-cycling system/equipment resulting in significant disruption to the availability of the system/equipment to perform its intended function and therefore a significant disruption to all provisioned services; and employing memory storage devices which have ECC while incurring a high cost.

Therefore, the typical mitigation of memory errors assume that all errors experienced by integrated circuit memory storage devices are hard errors requiring replacing the entire memory storage device.

More recently, as memory storage device operational voltages have decreased, improved understanding of soft-errors has enabled other steps to be taken. The most relevant of these steps to the present description is a solution proposed by Cisco Systems, Inc., in a white paper, entitled "Increasing Network Availability," which describes a process which scans for parity errors throughout memory storage devices without ECC. Additionally, the paper states that as a matter of standard practice, hardware components employing memory storage devices affected by the parity errors should be replaced on the second such single event upset. Without knowledge of the cause of the parity error, this practice results in unnecessary maintenance overheads, and possibly prolonged system downtime, which could be avoided in the case when the cause of an experienced parity error is a soft-error.

Prudent systems design calls for budgeting and employing integrated circuit memory storage devices larger than strictly required, mainly to delay systems obsolescence as systems are expected to undergo upgrades post deployment. The spare memory storage capacity employed exposes systems to a greater extent to soft-errors and therefore to greater maintenance overheads. Maintenance overheads for interconnected interdependent deployments compound, as the macro effects of soft-errors may only manifest themselves on equipment adjacent to the equipment employing the actual soft-error affected integrated circuit storage device.

As the importance and impact of soft-errors has just begun to be realized, further improvement in system/service availability has been found to be hampered by the occurrence of soft-errors, particularly affecting systems having large memories required to provide high reliability over prolonged periods of time. Therefore there is a need to mitigate the deleterious effects of soft-errors experienced by high-reliability systems employing large integrated circuit memory storage storing data/code for extended periods of time.

SUMMARY OF THE INVENTION

In accordance with an aspect of the invention, an apparatus for detecting the occurrence of and for mitigating a soft-error affecting an integrated circuit memory storage device associated with a peripheral component of the apparatus is provided. An augmented memory allocation lookup table corresponding to the integrated circuit memory storage device tracks memory allocation. Each of a multitude of memory allocation entries of the lookup table stores an indication specifying a level of impact on one of the apparatus, the peripheral component, and provisioned services would experience if the memory region of the integrated circuit memory storage device corresponding to the memory allocation entry was reinitialized. Persistent storage means are employed for persistently storing alarm information regarding raised parity error alarms. Parity error detection means are employed for periodically ascertaining whether the integrated circuit memory storage device is affected by a parity error and for raising a parity error alarm. Soft-error mitigation means responsive to a raised parity error alarm are employed for selectively inspecting the augmented memory allocation table to select memory regions of the integrated circuit memory storage device in an order of increasing level of impact and for reinitializing the selected memory regions in increasing level of impact order.

In accordance with another aspect of the invention, a software solution for mitigating soft-errors in integrated circuit memory storage devices is provided.

In accordance with a further aspect of the invention, a method for detecting parity errors affecting an integrated circuit memory storage device is provided. The integrated circuit memory storage device is scanned for parity errors in accordance with a meta parity error scanning discipline. All previous parity error alarms are selectively cleared if a parity error is not detected during the parity error scan. A critical alarm is selectively raised subsequent to a restart if a parity error alarm had been raised previously and if the parity error persists following the restart. And, the parity error alarm is selectively raised if a subsequent parity error is detected during a subsequent meta parity error scan.

In accordance with yet another aspect of the invention, a method for mitigating soft-errors affecting an integrated circuit memory storage device is provided. Responsive to a raised parity error alarm indicating that the integrated circuit memory storage device is affected by a parity error, memory allocation entries of an augmented memory allocation table tracking the utilization of the integrated circuit memory storage device are inspected to identify at least one inactive memory region. Each identified inactive memory region is reinitialized. The parity error alarm is selectively cleared if a directed parity error scan of the integrated circuit memory storage device no longer detects the parity error. And, if the directed parity error scan continues to detect the parity error, a determination is made whether a redundant deployment prevails; and if a redundant deployment prevails one of a peripheral corresponding to the integrated circuit memory storage device and the apparatus corresponding to the integrated circuit memory storage device is reset.

Advantages are derived from an autonomous recovery process integrated circuit memory storage devices which detects and attempts to correct soft-errors at run-time while increasing availability, and reducing the need for hardware replacement. Another advantage is derived by applying the software solution described to field installed equipment deployed without (hardware) Error Correction Coding (ECC) capabilities. Yet another advantage is derived from reducing false positive hardware diagnostic failures caused by soft-errors.

BRIEF DESCRIPTION OF THE DRAWINGS

The features and advantages of the invention will become more apparent from the following detailed description of the exemplary embodiments with reference to the attached diagrams wherein.

It will be noted that in the attached diagrams like features bear similar labels.

DETAILED DESCRIPTION OF THE EMBODIMENTS

There is a growing need to identify and to correct soft-errors in a manner that is non-service-affecting during the operation of integrated circuit memory storage devices affected by soft-errors. This need has only recently been felt, perhaps in the last one or two years, as recent improvements have led to significant reductions in hard-errors resulting from design flaws and manufacturing defects, thereby exposing chance soft-error instances as the origins and as the effects of soft-errors have become better understood.

In view of the above, parity checking techniques are being proposed to employ parity error detection in order to identify and address soft-errors experienced by integrated circuit memory storage devices.

Field testing has shown that there is statistical evidence to conclude that the majority of parity errors, between 60 to 70%, affecting deployed telecommunications equipment are due to soft-errors typically occurring in inactive memory storage regions leading to an alarm and diagnostic failure "noise" which represents a substantial portion of the maintenance overhead. The remaining soft-errors affect active regions of memory storage typically storing executable code or data. Overall it has been found that soft-errors account for greater than 90% of parity errors in deployed communications equipment.

Therefore, means of identifying and correcting soft-errors in inactive (unused) and active (used) areas of integrated circuit memory storage devices is desired so as to reduce alarm and diagnostic failure "noise", and to reduce equipment downtime and maintenance time. Mitigating soft-errors improves robustness leading to a reduction in unnecessary perceived quality concerns. Mitigating such soft-errors at run-time would also increase service availability. Equipment downtime would be necessary only to address persistent parity errors due to hardware faults.

Figure 1:
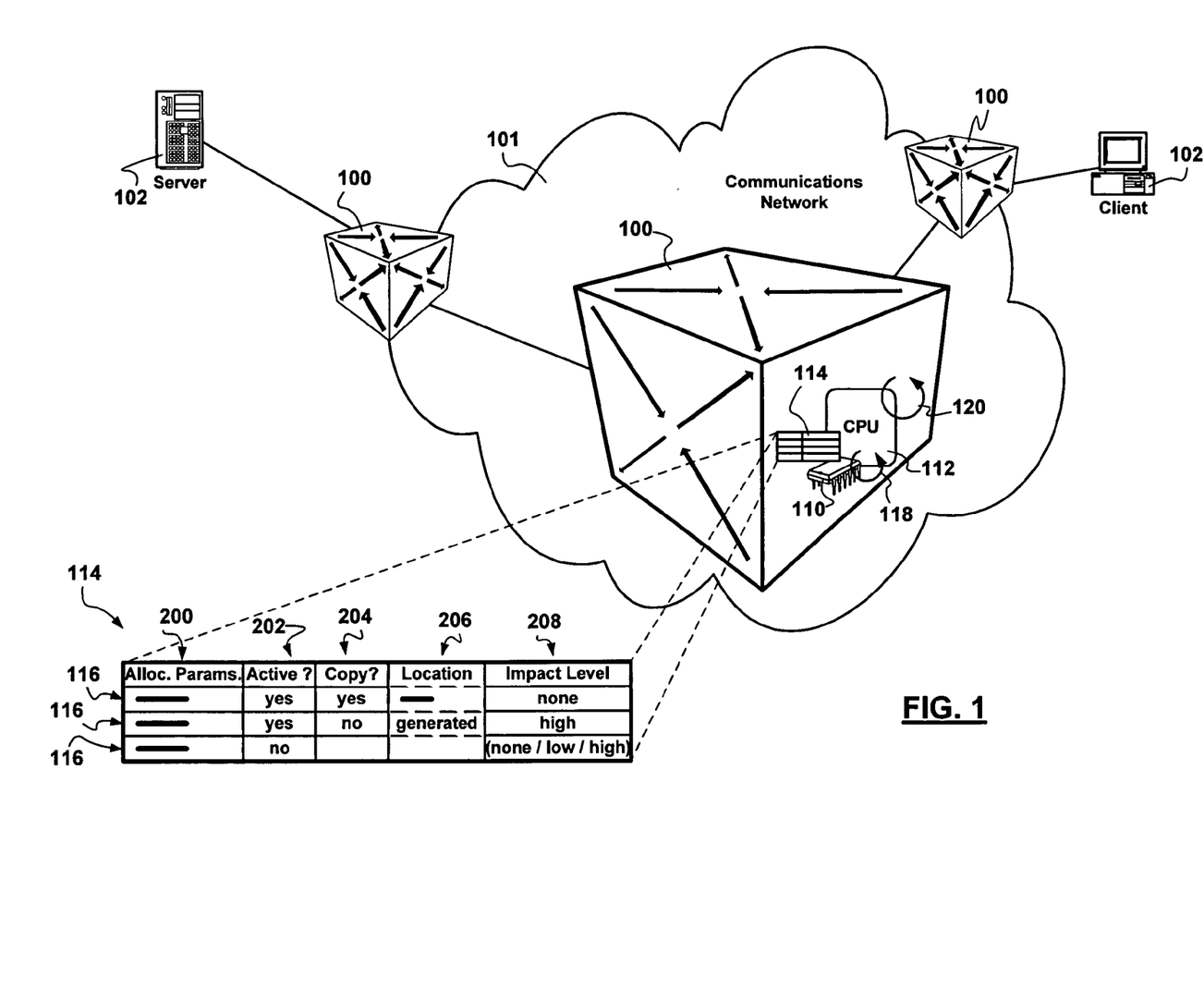
FIG. 1 is a schematic diagram showing an exemplary communications deployment in accordance with an exemplary embodiment of the invention, and in particular showing elements implementing soft-error mitigation for integrated circuit memory storage devices.

FIG. 1 is representative of an integrated circuit memory storage device employed in a typical system provisioning services. For the purpose of reducing the invention to practice, without limiting the invention thereto, system 100 is an exemplary communications network element interconnected and cooperating with adjacent exemplary communication network elements 100 to provision services between network nodes 102 served by the communications network 101. Integrated circuit memory storage devices, such as integrated circuit memory storage device 110 generally referred to as memory chips, are employed to store executable code and data employed by processors 112 to process service and ancillary content. Without limiting the invention, the integrated circuit memory storage device 110 is shown in a one-to-one association with processor 112. Deployment scenarios (not shown) exist wherein multiple integrated circuit memory storage devices 110 are associated in a many-to-one manner with a processor 112, and further deployments exist wherein a single integrated circuit memory storage device 110 is associated in a one-to-many manner with a multitude of processors 112. The invention is not limited to deployments where the processor 112 and the integrated circuit memory storage device 110 are discrete elements; Central Processing Units (CPUs) typically employ at least one memory cache. While extensive reference will be made herein to a processor 112, processor 112 is understood to include micro-processors, CPUs, Field Programmable Gate Arrays (FPGA), Application Specific Integrated Circuits (ASICs), etc. the relevant feature being the ability to execute code. The association between the integrated circuit memory storage device 110 and the processor 112 includes deployments wherein the processor 112 is "off-board" with respect to the integrated circuit memory storage device 110, the integrated circuit memory storage device 110 being said to be part of a peripheral component controlled by the processor 112.

In accordance with an exemplary embodiment of the invention, an augmented memory allocation lookup table 114 is provided for tracking the utilization of the integrated circuit memory storage device 110. Entries in the augmented memory allocation lookup table 114 track memory storage allocation 200 with respect to the integrated circuit memory storage device 110. Memory storage utilization tracking techniques are described elsewhere and are limited to ensuring that memory storage resources are expended in accordance with the heuristics of the deployment. While extensive research and development is being concurrently conducted into memory storage utilization tracking, for the purposes of the present description it will be assumed that the integrated circuit memory storage device 110 provides ample memory storage for the intended operation of the system 100. In fact, as application specifications allow, larger than strictly necessary integrated circuit memory storage devices 110 are typically employed in order to minimize equipment obsolescence; it is not uncommon for more than double the necessary memory storage capacity to be employed.

In accordance with the exemplary embodiment of the invention, each entry 116 in the augmented memory allocation lookup table 114, besides specifying the size 200 of the memory block tracked, also specifies 202 whether the tracked memory block is currently part of active or inactive memory; when active, whether 204 the active memory block holds data or code for which a copy is available, and optionally if a copy is available, the location 206 of the copy; and whether 208 refreshing the data or code would affect services. Optionally, for deployments in which the integrated circuit memory storage device 110 is employed by one of a redundant group of peripheral subsystems of system 100, entries may specify (not shown) whether provisioned services are protected through redundancy. Deployments are envisioned in which indications whether a hot-standby deployment prevails is not specified in respect of every entry 116 in the augmented memory allocation lookup table 114, but rather the processor 112 possesses or has access to such information. Information regarding the existence of redundancy is typically available in managed deployments wherein the processor 112 is "off-board" with respect to managed subject integrated circuit memory storage devices 110.

Figure 2:
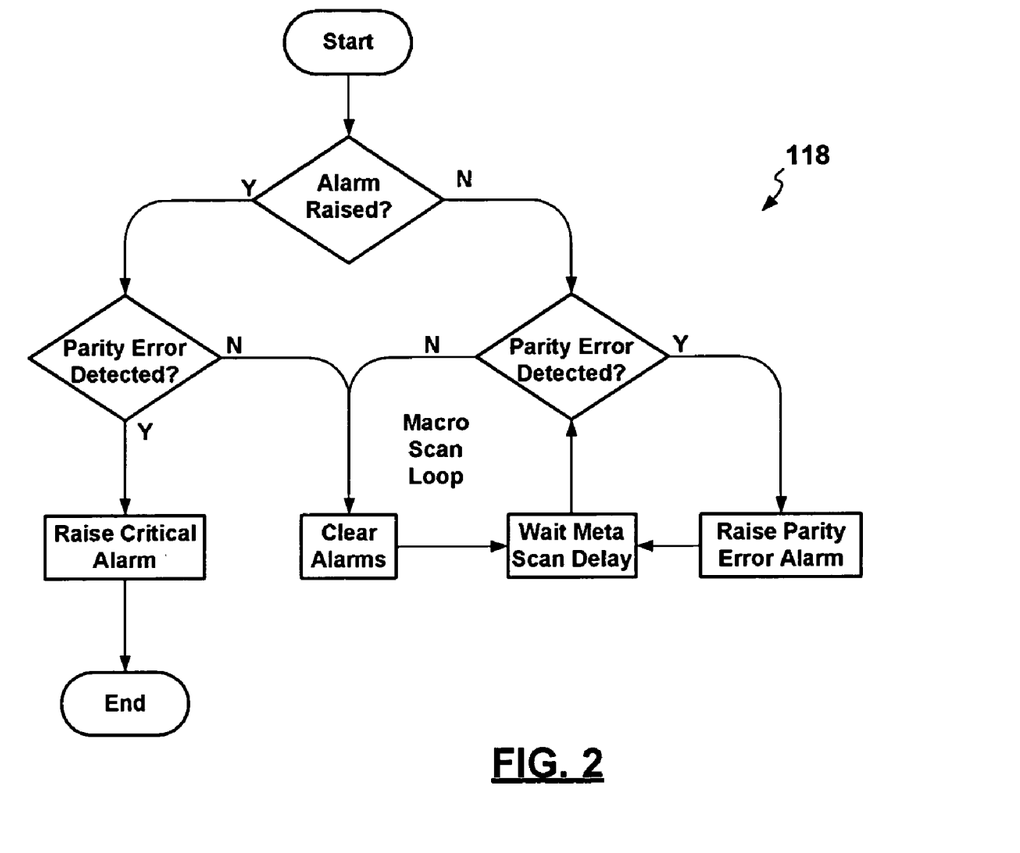
FIG. 2 is a flow diagram showing, in accordance with the exemplary embodiment of the invention, process steps implementing a parity error detection process tracking attempts at mitigating soft-errors experienced by an integrated circuit memory storage device.

In accordance with the exemplary embodiment of the invention, at least one processor 112 associated with the integrated circuit memory storage device 110 employs parity checking techniques 118 shown in FIG. 2 implemented as executable code, the processor 112 typically executing at least one executable routine which is controllably invoked, at the macro level, to scan the entire integrated circuit memory storage device 110 for parity errors to ensure component integrity across the entire memory space. It is envisioned that simple parity error checking would alternatively be implemented on the integrated circuit memory storage device 110 and initiated at the macro level based on a signal or an instruction from the processor 112, subject to a parity checking discipline, typically periodically. The result of each parity error scan indicates, devoid of any specifics, whether a parity error was detected. In fact, since the result of the parity error scan is devoid of any specifics, the result indicates whether at least one parity error was detected. Care must be exercised, typically based on statistical evidence, to ensure that the parity checking discipline invokes parity error scanning at the macro level often enough to ensure that a single parity error is detected. It is understood that memory region specific memory bit error detection may provide more specific information regarding the location of the memory bit error, however implementing memory region specific memory bit error detection would incur a significant undesirable processing overhead.

In accordance with an exemplary embodiment of the invention, the processor 112 monitoring the integrated circuit memory storage device 110 implements soft-error mitigation techniques typically executing at least one executable routine 120 which is controllably and conditionally invoked following the detection of a parity error during a meta scan. The soft-error mitigation process involves a sequence of steps, including directed parity error scans. Care should be exercised to perform the meta parity error scanning sparsely enough to allow completion of the soft-error mitigation process to debounce parity error detection instances.

Figure 3:
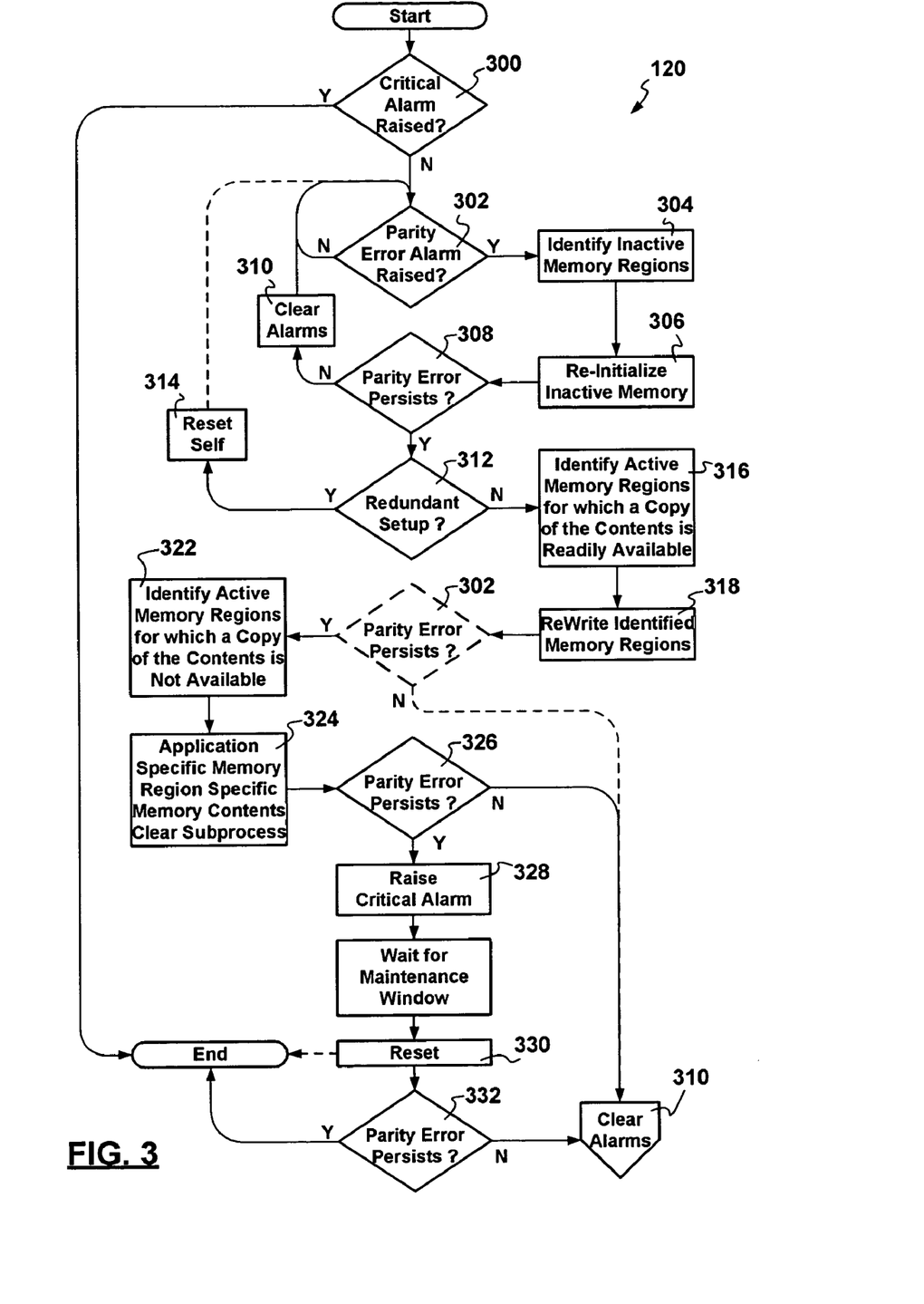
FIG. 3 is a flow diagram showing, in accordance with the exemplary embodiment of the invention, process steps implementing soft-error mitigation for the integrated circuit memory storage device.

FIG. 3 is an exemplary flow diagram showing exemplary steps of a soft-error mitigation process 120. In accordance with the exemplary embodiment of the invention, the soft-error mitigation process 120 is invoked following the detection of a soft-error during a meta parity error scan 118. Regardless of the manner in which the integrated circuit memory storage device 110 and the processor 112 are associated it is important, although not required for all deployments, that the detection of the parity error during the meta scan 116 be flagged in a persistent manner. Flagging the detection of parity errors in a persistent manner is important, as described herein below, as the soft-error mitigation techniques may include a peripheral subsystem reset. For example an indication that a parity error was detected in the integrated circuit memory storage device 110 is stored off-board with respect to the integrated circuit memory storage device 110 and/or off-board with respect to the peripheral subsystem employing the integrated circuit memory storage device 110.

The execution of the soft-error mitigation process 120 is triggered for example by decision step 302 which checks repeatedly 302 whether the meta level parity error scan 118 uncovered an error. (Step 300 is described herein below.) In accordance with the exemplary embodiment of the invention, a staged approach is employed to determine whether the parity error experienced is due to a soft-error in an attempt to mitigate it at a reduced impact to the system 100, the peripheral subsystem and provisioned services. Each subsequent stage of the soft-error mitigation process 120 corresponds to an increasing order of impact to combinations of the peripheral subsystem, system 100, and services provisioned therethrough. As described herein below, reaching the final stage of the soft-error mitigation process 120 while the parity error persists, it can be concluded that the experienced parity error is a hard failure. The staged soft-error detection and correction approach reduces system downtime to hard failure instances, which represents a vast improvement over currently known techniques.

In accordance with the exemplary embodiment of the invention, in view of the above described typical deployments and integrated circuit memory storage usage, the first stage of the soft-error mitigation process 120 assumes that the parity error is due to a soft-error located in inactive/unused memory. The augmented memory allocation lookup table 114 is consulted in step 304 to identify entries 116 corresponding to inactive/unused 202 memory storage regions. All inactive memory storage regions identified are re-initialized in step 306 using integrated circuit memory storage device specific algorithms. Exemplary memory re-initialization algorithms include resetting all memory cell states to one of a logic high value and a logic low value. As inactive memory regions may not necessarily be used by services, all currently provisioned services are only marginally impacted as access to the integrated circuit memory storage device 110 is delayed until the selective re-initialization step 306 completes. The provision of new services may be marginally impacted as attempts to allocate memory would be blocked during the re-initialization of the unused memory storage regions, because new memory allocations would require accessing the unused memory storage regions. Selective blocking of unused memory storage regions may be employed; however it was found that selective blocking can introduce inefficiencies in the execution of the soft-error mitigation process 120.

Following the re-initialization step 306, the soft-error mitigation process 120 performs a directed parity error check to determine 308 whether the integrated circuit memory storage device 110 is still affected by the parity error.

If it is determined in step 308 that the parity error is no longer affecting the integrated circuit memory storage device 110, it is concluded that the parity error which triggered the soft-error mitigation process 120 has been corrected successfully and the soft-error mitigation process 120 requests the clearing of the alarm 310 and resumes from step 302. Given the above mentioned finding that 60 to 70% of parity errors are caused by soft-errors affecting unused/inactive memory, these preliminary steps alone reduce maintenance overheads by 60 to 70% as the herein presented soft-error mitigation process 120 automatically attends to parity error alarm "noise".

Depending on the particular deployment, employing the soft-error mitigation techniques presented herein, information regarding provisioned redundancy may be available to processors 112 typically off-board with respect to the subject integrated circuit memory storage device 110. If the error persists, the soft-error mitigation process 120 proceeds to step 312 wherein it is determined whether a redundant deployment prevails.

If a redundant deployment is found in step 312 to prevail, then the soft-error mitigation process 120, depending on implementation either requests or performs a reset 314 of the peripheral subsystem employing the affected integrated circuit memory storage device 110. All processing is switched over to the peer subsystem, and subsequent to the reset 314, the soft-error mitigation process 120 resumes from step 302. Actively provisioned services would not experience any disruption by design. Incidentally, a redundant setup will ensure that new services would continue to be provisioned both during the re-initialization step 306 and during the switchover (314).

Deployments exist wherein knowledge of the use of redundancy is not provided to redundant equipment, by design, in order to provide hot-standby redundancy wherein each peer subsystem providing the redundancy acts as if it is the only active device. Therefore, if the processor 112 is directly associated with the integrated circuit memory storage device 110 while the combination of the integrated circuit memory storage device 110 and processor 112 is part of a hot-standby redundant setup, the result of the determination performed in step 312 would be negative by design.

Accordingly, for redundant deployments, wherein the processor 112 monitoring the integrated circuit memory storage device 110 has knowledge that a redundant setup prevails, the above presented steps of the soft-error mitigation process 120, would autonomously attend to, and correct, all parity errors caused by soft-errors, including soft-errors affecting active/used memory regions. If the meta scanning process 118 continues detect the parity error following the reset 314, it is assumed that the parity error is due to a hard failure, and a critical parity error alarm is raised.

If the result of the inquiry 312 whether a redundant deployment prevails is negative, in accordance with the exemplary embodiment of the invention, the next stage of the soft-error mitigation process 120 assumes that the persisting parity error is a soft-error affecting only active memory regions the re-initialization of which would have a minimal/low impact on provisioned services, and proceeds to attempt to correct the soft-error. The level of the impact depends on a variety of factors which depend on the particular deployment. For example, the impact level specification 208 of each lookup table entry 116, without limiting the invention, may be set a priori based on whether a copy of the memory contents is readily available 204, whether rewriting the affected memory regions is a non-service affecting procedure to the extent that service level agreements for provisioned services are not violated, whether the memory contents can be re-generated in such a manner that service level agreements for provisioned services are not violated, and/or whether the disruption to services is less than a hard reset or long-term equipment decommissioning pending replacement.

In accordance with the exemplary embodiment of the invention, the augmented memory allocation lookup table 114 is consulted in step 316 to identify low impact 208 memory regions for which copies of the contents are readily available 204. Memory regions which can easily be rewritten 318 using simple algorithms without a significant impact to the operation of the system 100 are targeted first. It is common for information stored in certain memory regions to have an exact duplicate backup copy at another specified location, or for the information to be a subset of information stored in a remote database. In rewriting 318 the memory contents of the memory regions identified in step 316 the soft-error mitigation process 120 uses the location information 206 to request and obtain copies of the memory contents. There may be little to no impact to provisioned services. Any impact is limited to short time periods as each low impact active memory region is written 318 to.

An optional directed parity error scan 320 is performed to ascertain whether the parity error was a soft-error fixed by the rewrite 318. If the directed parity error scan 320 determines that the parity error is no longer present, then the soft-error mitigation process 120 resumes from step 310, by clearing the alarm.

If the parity error persists, or if the directed parity error scan 320 is not performed, in accordance with the exemplary embodiment of the invention, the soft-error mitigation process 120, consults the augmented memory allocation lookup table 114 to identify 322 low impact memory regions (208) for which copies of contents are not available (204), but for which the memory contents are generated at run-time. Depending on implementation, if the augmented memory allocation lookup table 114 does not track location information, it may be assumed that the memory contents are generated at run-time and therefore can be regenerated. In respect of communications applications, address resolution tables stored on integrated circuit memory storage devices 110 represent exemplary memory contents which are generated as traffic content is being processed by communications network nodes 100.

In accordance with exemplary embodiment of the invention, having identified 322 the low impact memory regions for which contents can be regenerated, the soft-error mitigation process 120 clears 324 the memory regions. Depending on the particular deployment, the integrated circuit memory storage device 110 may store a specific type of information only, say address resolution records, or the integrated circuit memory storage device 110 may store mixed information. In step 324 the soft-error mitigation process 120 invokes application-specific/memory-region-specific memory clear subprocesses. For deployments wherein the processor 112 only executes application-specific code accessing the identified 322 memory regions, it may be possible to forgo the invocation of application-specific memory clear subprocesses and to just reinitialize the identified regions. Care must be exercised regarding choosing the values to which all memory locations are reinitialized as some values are reserved for protocol specific functionality. If a close coupling between the processor 112 and the integrated circuit memory storage device 110 does not exist, then the protocols which employ the identified 322 regions are invoked to clear respective regions. For example, if such an identified 322 memory region stores address resolution information, then address table access and maintenance routines are invoked to rewrite each record with null addressing information in an orderly fashion. Subsequently a directed parity error search 326 is performed again and if no parity error is detected then the soft-error mitigation process 120 resumes from step 310.

The service impact incurred in during step 324, may not be trivial. For the address resolution example, the provision of services would continue however a brief interruption would be experienced, if at all, as address resolution entries are regenerated. As another example, a memory region identified in step 322 may store physical layer connectivity information. For an exemplary deployment which stores network layer connectivity information elsewhere and uses the network layer connectivity information to regenerate physical layer connectivity information, the memory region is designated as having a low service impact. Physical connectivity may be lost as the memory region is cleared, and then regained potentially with different connectivity parameters reestablished/renegotiated by higher layer protocols. Temporary interruption of service may occur as related functionality is disabled prior to the memory clearing step 324 and subsequently enabled. In accordance with an exemplary implementation of the exemplary embodiment of the invention, steps 322 and 324 of the soft-error mitigation process 120 may be performed at designated times and/or during maintenance windows.

Aside from deployments in which active memory regions having a significant impact on services if reset make up a large portion of the total active memory, the soft-error mitigation process 120 provides autonomous mitigation of soft-errors at substantial overhead reductions, therefore providing a corresponding increase in system availability.

If the directed parity error search performed in step 326 indicates that the parity error continues to affect the integrated circuit memory device 110, one of two possibilities exist: either a soft-error exists in an active memory region which would have a significant impact on one of the system 100, the peripheral component, and services or that the integrated circuit memory storage device 110 is affected by a hard error. The soft-error mitigation process 120 proceeds, in a subsequent stage, to raise a critical alarm in step 328, signifying that the attention of operation management personnel is warranted.

In accordance with an exemplary implementation of the exemplary embodiment of the invention, in order to eliminate the possibility that a soft-error affects active memory regions having a significant impact on services if reset, the soft-error mitigation process 120, depending on the implementation in step 330 either requests or invokes a reset during a maintenance window.

If the processor 112 is closely associated with the integrated circuit memory storage device 110, the reset 330 may affect the peripheral subsystem containing both the integrated circuit memory storage device 110 and the processor 112. Depending on implementation, the reset 330 may affect the entire system 100, in which case the soft-error mitigation process 120 terminates. Whether the soft-error was affecting active memory regions having a significant impact on services if reset, would only be determined in step 300 subsequent to the restart of the soft-error mitigation process 120.

If the peripheral subsystem containing the integrated circuit memory storage device 110 can be reset 330 independent of the operation of the processor 120 then another directed parity error search 332 may be performed to determine if the soft-error affects active memory regions having a significant impact on services if reset. If the parity error is no longer detected then the soft-error mitigation process 120 resumes from step 310 by clearing the alarms, otherwise the soft-error mitigation process 120 terminates.

The invention is not limited by the assumption, that generating memory contents has a higher impact on one of the system 100, the peripheral component, and services, than rewriting memory regions with copies of contents. Certainly, operational conditions my exist in accordance with which it may take more time to obtain copies of memory region contents from a remote database than to regenerate them as needed. Therefore steps 314, 318, 324, and 330 of the soft-error mitigation process 120 may be performed out of the order described above in the spirit of performing steps in an order of increasing impact on one of the system 100, peripheral component, and services.

Accordingly the soft-error mitigation process 120 provides an autonomous run-time identification and clearing of all soft-errors occurring throughout the operational life of a system/peripheral subsystem greatly reducing unnecessary equipment maintenance. Given that soft-errors have been found to account for more than 90% of parity errors in deployed communications equipment, the soft-error mitigation process therefore provides substantial corresponding communications network management overhead reductions.

Despite several soft-errors affecting the integrated circuit memory storage device 110 over time, costly replacement of the affected equipment can be delayed or eliminated, equipment replacement being only necessary in the event that hard-errors affect the integrated circuit memory storage device 110.

When implemented in redundant deployments, the methods presented herein provide an additional measure of protection, an additional indication that services may be affected, and an additional trigger for switching to backup equipment ensuring high system availability.

The solution presented herein provides a software upgradeable solution which improves robustness of existing and future deployments reducing costly hardware replacement and/or re-design.

For brevity and to simplify the description of the soft-error mitigation process 120 presented herein above, extensive reference was made to the augmented memory allocation table 114. While it was mentioned that the augmented memory allocation table 114 is populated with information prior to the invocation of the soft-error mitigation process 120, the invention is not limited to implementations wherein the utilization of the integrated circuit memory storage device 110 is known a priori. It is envisioned that run-time memory region reservation/allocation techniques include memory allocation function calls the parameters of which specify whether a copy of the contents is available elsewhere, the location of the copy, whether the contents can be regenerated at run-time, the level of impact a reinitialization of the region would have, etc. The invention applies equally well to implementations wherein the information held in the augmented memory allocation table 114 described above is determined at run-time based on a prior art memory allocation table used together with impact determination processes. Design choice is exercised at implementation. The augmented memory allocation table 114 reduces run-time processing overheads when the use thereof is implemented during the initial design of the system 100. Retrofit/upgrade implementations may have to rely on impact determination processes, as modifying previously employed memory allocation tables would incur substantial redevelopment overheads, substantial testing and validation overheads, etc. For greater certainty, regardless which implementation prevails, if a prior art memory allocation table is used, another corresponding intermediary augmented memory allocation table 114 would be employed during operation, irrespective of how and when such an augmented memory allocation table 114 is populated.

While extensive reference to communications equipment was made in the above description, a person skilled in the art would understand that the principles and working of the solution presented herein, are applicable to other equipment employing either large amounts of integrated circuit memory storage and/or equipment having integrated circuit storage required to be operational for long periods of time, and/or equipment having integrated circuit storage operating under improper cooling conditions. Other deployments include computing applications, storage area network applications, and other high-reliability applications characterized by the use of large amounts of integrated circuit memory storage and/or a need to store information for long periods of time.

The embodiments presented are exemplary only and persons skilled in the art would appreciate that variations to the above described embodiments may be made without departing from the spirit of the invention. The scope of the invention is solely defined by the appended claims.

We claim:

1. An apparatus for detecting the occurrence of and for mitigating a soft-error affecting an integrated circuit memory storage device associated with a peripheral component of the apparatus and provisioned services, the apparatus comprising:

an augmented memory allocation lookup table corresponding to the integrated circuit memory storage device tracking memory allocation, each of a plurality of memory allocation entries of the augmented memory allocation lookup table storing an indication specifying a level of impact one of the apparatus, the peripheral component, and the provisioned services would experience if the memory region of the integrated circuit memory storage device corresponding to the memory allocation entry was reinitialized;

persistent storage means for persistently storing alarm information regarding raised parity error alarms;

parity error detection means for periodically ascertaining whether the integrated circuit memory storage device is affected by a parity error and for raising a parity error alarm;

soft-error mitigation means responsive to a raised parity error alarm for selectively inspecting the augmented memory allocation lookup table to select memory regions of the integrated circuit memory storage device in an order of increasing level of impact and for reinitializing the selected memory regions in increasing level of impact order.

2. An apparatus as claimed in claim 1, wherein each entry of the augmented memory allocation lookup table further specifies whether a copy of contents stored in the corresponding memory region of the integrated circuit memory storage device is available from a specified remote location, the soft-error mitigation means further comprising means for obtaining the copy of the contents from the specified remote location and for rewriting the memory region with the copy of the contents.

3. An apparatus as claimed in claim 1, further comprising means for resetting one of the peripheral component and the apparatus during a maintenance window.

4. An apparatus as claimed in claim 1, further comprising:
redundancy specification means indicating that the peripheral is one of a redundant group of peripherals; and
means for resetting the peripheral component subject to a parity error alarm being raised.

5. An apparatus as claimed in claim 1, wherein the integrated circuit memory storage device comprises internal logic means for scanning for parity errors therein.

6. An apparatus as claimed in claim 1, wherein the means for detecting parity error and the means for mitigating soft-errors comprises executable code.

7. A method for detecting parity errors affecting an integrated circuit memory storage device, the method comprising:
scanning the integrated circuit memory storage device for parity errors in accordance with a meta parity error scanning discipline;
selectively clearing all parity error alarms if a parity error is not detected during the parity error scan;
selectively raising a critical alarm subsequent to a restart if a parity error alarm had been raised previously and if the parity error persists following a restart; and
selectively raising the parity error alarm if a subsequent parity error is detected during a subsequent meta parity error scan.

8. A method claimed in claim 7, wherein the meta parity error scanning discipline includes periodic scanning for parity errors.

9. A method claimed in claim 7, further including invoking a parity error scan performed by logic of the integrated circuit memory storage device.

10. A method for mitigating soft-errors affecting an integrated circuit memory storage device, the method comprising:
responsive to a raised parity error alarm indicating that the integrated circuit memory storage device is affected by a parity error, inspecting memory allocation entries of an augmented memory allocation lookup table tracking the utilization of the integrated circuit memory storage device to identify at least one inactive memory region;
reinitializing the at least one inactive memory region;
selectively clearing the parity error alarm if a first directed parity error scan of the integrated circuit memory storage device no longer detects the parity error; and
if the first directed parity error scan of the integrated circuit memory storage device continues to detect the parity error:
determining whether a redundant deployment prevails; and
selectively resetting one of a peripheral corresponding to the integrated circuit memory storage device and the apparatus corresponding to the integrated circuit memory storage device if a redundant deployment prevails.

11. A method as claimed in claim 10, wherein if a redundant deployment does not prevail and if the first directed parity error scan of the integrated circuit memory storage device continues to detect the parity error, the method further comprises:
inspecting memory allocation entries of the augmented memory allocation lookup table to identify at least one active memory region having a low impact on the operation of one of the apparatus and provisioned services if reinitialized and having a copy of the contents thereof stored at a remote specified location;
rewriting the at least one active low impact memory region with contents retrieved from the remote location; and
clearing the parity error alarm if a second directed parity error scan of the integrated circuit memory storage device no longer detects the parity error.

12. A method as claimed in claim 11, wherein if the second directed parity error scan of the integrated circuit memory storage device continues to detect the parity error, the method further comprises:
inspecting memory allocation entries of the augmented memory allocation lookup table to identify at least one active memory region having a low impact on the operation of one of the apparatus and provisioned services if reinitialized, the contents of which are run-time generated;
reinitializing the at least one active low impact memory region; and
clearing the parity error alarm if a third directed parity error scan of the integrated circuit memory storage device no longer detects the parity error.

13. A method as claimed in claim 12, wherein reinitializing the at least one active low impact memory region includes invoking at least one routine of a protocol maintaining the contents of the active low impact memory region.

14. A method as claimed in claim 12, wherein if the third directed parity error scan of the integrated circuit memory storage device continues to detect the parity error, the method further comprises raising a critical parity error alarm.

15. A method as claimed in claim 14, further comprising resetting one of the apparatus and the peripheral corresponding to the integrated circuit memory storage device during a maintenance window.

* * * * *